(12) United States Patent
Li et al.

(10) Patent No.: US 11,501,407 B2
(45) Date of Patent: Nov. 15, 2022

(54) METHOD AND APPARATUS FOR IMAGE PROCESSING, AND COMPUTER STORAGE MEDIUM

(71) Applicant: BEIJING SENSETIME TECHNOLOGY DEVELOPMENT CO., LTD., Beijing (CN)

(72) Inventors: Tong Li, Beijing (CN); Wentao Liu, Beijing (CN); Chen Qian, Beijing (CN)

(73) Assignee: BEIJING SENSETIME TECHNOLOGY DEVELOPMENT CO., LTD., Beijing (CN)

( * ) Notice: Subject to any disclaimer, the term of this patent is extended or adjusted under 35 U.S.C. 154(b) by 285 days.

(21) Appl. No.: 17/073,824

(22) Filed: Oct. 19, 2020

(65) Prior Publication Data
US 2021/0035260 A1 Feb. 4, 2021

Related U.S. Application Data

(63) Continuation of application No. PCT/CN2019/123742, filed on Dec. 6, 2019.

(30) Foreign Application Priority Data

Apr. 30, 2019 (CN) .................. 201910361904.X

(51) Int. Cl.
G06T 3/00 (2006.01)
G06T 3/40 (2006.01)
G06V 10/44 (2022.01)
G06V 40/10 (2022.01)

(52) U.S. Cl.
CPC .............. G06T 3/0012 (2013.01); G06T 3/40 (2013.01); G06V 10/44 (2022.01); G06V 40/10 (2022.01)

(58) Field of Classification Search
None
See application file for complete search history.

(56) References Cited

U.S. PATENT DOCUMENTS 7,627,178 B2    12/2009  Suzuki
7,812,850 B1 *  10/2010  Nelson ................... G06T 11/60
                                              345/646
(Continued)

FOREIGN PATENT DOCUMENTS

CN   106558039 A   4/2017
CN   107665477 A   2/2018
(Continued)

OTHER PUBLICATIONS

International Search Report in the International application No. PCT/CN2019/123742, dated Mar. 9, 2020, 3 pgs.

Primary Examiner — Anand P Bhatnagar
(74) Attorney, Agent, or Firm — Cooper Legal Group, LLC

(57) ABSTRACT

A method and apparatus for method for image processing, and a computer storage medium are provided. The method includes: obtaining a first image, identifying a target object in the first image, and obtaining leg detection information of the target object; respectively determining a contour line and a target line of a leg region of the target object based on the leg detection information; and performing image deformation processing on the leg region based on the contour line and the target line of the leg region to generate a second image.

20 Claims, 3 Drawing Sheets

(56) References Cited

U.S. PATENT DOCUMENTS

| | | | |
|---|---|---|---|
| 8,813,378 B2* | 8/2014 | Grove | A41H 3/00 |
| | | | 33/17 R |
| 10,603,112 B2* | 3/2020 | Kumar | A61B 34/25 |
| 11,020,186 B2* | 6/2021 | Kumar | A61B 34/10 |
| 11,216,904 B2* | 1/2022 | Liu | G06T 11/60 |
| 11,227,008 B2* | 1/2022 | Wiesel | G06V 40/10 |
| 11,288,796 B2* | 3/2022 | Liu | G06T 9/20 |
| 11,386,601 B2* | 7/2022 | Kristal | G06Q 30/0643 |
| 11,432,931 * | 9/2022 | Lang | G16H 50/20 |
| 2006/0212157 A1* | 9/2006 | Watanabe | A41H 3/007 |
| | | | 700/133 |
| 2017/0265944 A1* | 9/2017 | Shupe | A61B 17/157 |
| 2019/0259190 A1* | 8/2019 | Kristal | G06Q 30/0643 |
| 2020/0179055 A1* | 6/2020 | Kumar | A61B 34/25 |
| 2021/0145520 A1* | 5/2021 | Shupe | A61B 34/10 |

FOREIGN PATENT DOCUMENTS

| | | |
|---|---|---|
| CN | 107808137 A | 3/2018 |
| CN | 108765274 A | 11/2018 |
| CN | 108830200 A | 11/2018 |
| CN | 108830783 A | 11/2018 |
| CN | 108830784 A | 11/2018 |
| CN | 109191414 A | 1/2019 |
| CN | 109325907 A | 2/2019 |
| CN | 110136051 A | 8/2019 |
| TW | 201413649 A | 4/2014 |

* cited by examiner

METHOD AND APPARATUS FOR IMAGE PROCESSING, AND COMPUTER STORAGE MEDIUM

CROSS-REFERENCE TO RELATED APPLICATION

The present disclosure is a continuation application of International Application No. PCT/CN2019/123742, filed on Dec. 6, 2019, which claims priority to Chinese Patent Application No. 201910361904.X, filed on Apr. 30, 2019. The disclosures of International Application No. PCT/CN2019/123742 and Chinese Patent Application No. 201910361904.X are incorporated herein by reference in their entireties.

TECHNICAL FIELD

The present disclosure relates to image processing technologies, and in particular, to a method and apparatus for image processing, and a computer storage medium.

BACKGROUND

As rapid developments of Internet technologies, various image processing tools appear, and may process a character in an image. For example, processing such as "leg slimming" and "leg stretching" that make a character body more perfect may be performed on a target character in the image. However, the image processing operations require manual operations of an operator and require multiple adjustment operations before achieving an optimal adjustment effect.

SUMMARY

Embodiments of the present disclosure provide a method and apparatus for image processing, and a computer storage medium.

To achieve the aforementioned objective, the technical solutions in the embodiments of the present disclosure are achieved as below.

In a first aspect, the embodiments of the present disclosure provide a method for image processing, including: obtaining a first image, identifying a target object in the first image, and obtaining leg detection information of the target object; respectively determining a contour line and a target line of a leg region of the target object based on the leg detection information; and performing image deformation processing on the leg region based on the contour line and the target line of the leg region to generate a second image.

In a second aspect, the embodiments of the present disclosure also provide an apparatus for image processing, including: a detection unit and a deformation processing unit, where the detection unit is configured to obtain a first image, identify a target object in the first image, and obtain leg detection information of the target object; and respectively determine a contour line and a target line of a leg region of the target object based on the leg detection information. The deformation processing unit is configured to perform image deformation processing on the leg region based on the contour line and the target line of the leg region determined by the detection unit to generate a second image.

In a third aspect, the embodiments of the present disclosure further provide a non-transitory computer-readable storage medium, having stored thereon a computer program that, when executed by a processor, causes the processor to perform a method for image processing including: obtaining a first image, identifying a target object in the first image, and obtaining leg detection information of the target object; respectively determining a contour line and a target line of a leg region of the target object based on the leg detection information; and performing image deformation processing on the leg region based on the contour line and the target line of the leg region to generate a second image.

In a fourth aspect, the embodiments of the present disclosure further provide an apparatus for image processing, including a memory and a processor, where the memory is configured to store computer program instructions that, when executed by the processor, cause the processor to perform a method for image processing including: obtaining a first image, identifying a target object in the first image, and obtaining leg detection information of the target object; respectively determining a contour line and a target line of a leg region of the target object based on the leg detection information; and performing image deformation processing on the leg region based on the contour line and the target line of the leg region to generate a second image.

DETAILED DESCRIPTION

The present disclosure is further described in detail below with reference to the accompanying drawings and the specific embodiments.

Figure 1:
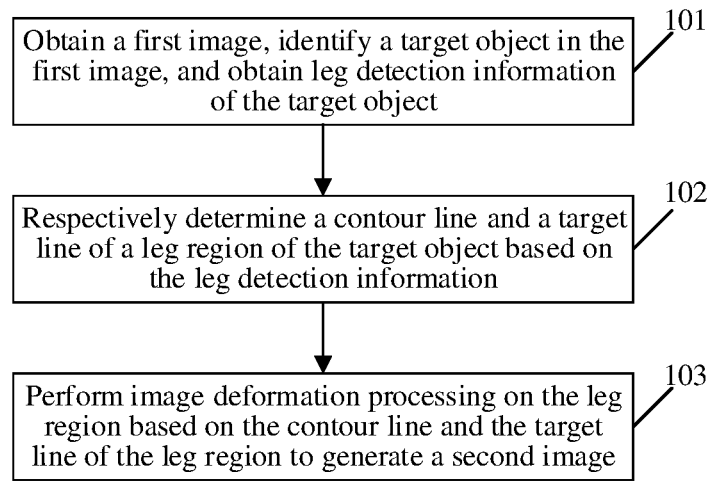
FIG. 1 is a schematic flowchart I of a method for image processing according to embodiments of the present disclosure.

Embodiments of the present disclosure provide a method for image processing. FIG. 1 is a schematic flowchart I of a method for image processing according to embodiments of the present disclosure. As shown in FIG. 1, the method includes the following steps.

At step 101: a first image is obtained, a target object in the first image is identified, and leg detection information of the target object is obtained.

At step 102: a contour line and a target line of a leg region of the target object are respectively determined based on the leg detection information.

At step 103: image deformation processing is performed on the leg region based on the contour line and the target line of the leg region to generate a second image.

In the embodiments, the method for image processing is applied to an apparatus for image processing. The apparatus for image processing may be located in cellphones, tablets, laptops, or other mobile terminals, and may also be located in desktop computers, all-in-one computers or other terminals.

The method for image processing in the embodiments performs image processing on the target object in the first image, and first identifies the target object in the first image, where the target object, as an object to be processed, may be a real character in the image. In other implementations, the target object may also be a virtual character, such as a cartoon character figure. Certainly, the target object may further be other types of objects, and is not limited in the embodiments. The method for image processing in the embodiments performs image deformation processing on the leg region of the target object in the first image. Taking the target object to be the character in the image as an example, the leg region may include the region above ankles and below the hip, for example, including ankles, shanks, knees, thighs, thigh roots, etc.

In some optional embodiments of the present disclosure, the leg detection information includes leg contour point information and leg key point information. The leg contour point information includes coordinate information of the leg contour point. The leg key point information includes coordinate information of the leg key point. The leg contour points represent the leg contour of the target object, that is, a leg contour edge of the target object may be formed by means of the coordinate information of the leg contour point. The leg key points represent key points of a leg skeleton of the target object, that is, a main skeleton of the leg region of the target object may be formed by means of the coordinate information of the leg key points and connection of the leg key points.

In some optional embodiments of the present disclosure, respectively determining the contour line and the target line of the leg region of the target object based on the leg detection information includes: determining the contour line of the leg region of the target object based on the leg contour point information and determining the target line of the leg region based on the leg key point information. It may be understood that the target line is a line formed by the leg key point information and may also be referred to as the central line of the leg region.

In some optional embodiments of the present disclosure, respectively determining the contour line and the target line of the leg region of the target object based on the leg detection information includes: determining the contour line of the leg region of the target object based on the leg contour point information; and determining a central point of the leg region based on the leg contour point information, determining a central line based on the determined central point, and determining the central line as the target line.

It may be understood that the leg region of the target object has an inner contour and an outer contour, that is, the leg region may have an outer contour line and an inner contour line. When assuming that the target object in the first image has two leg regions, each leg region has two contour lines, i.e., an outer contour line and an inner contour line. The outer contour line of one leg region refers to the contour line away from the other leg region in the two contour lines. The inner contour line refers to the contour line approaching the other leg region in the two contour lines.

In some implementations, the contour line may be formed by connecting the contour points. The target line may be formed by connecting the key points. In other implementations, the contour line is formed by connecting the contour points. The target line is formed by connecting middle points of connection lines between the inner contour points on the inner contour line and outer contour points on the outer contour line. Exemplarily, if five inner contour points, marked as inner contour points 1-5, exist on the inner contour line, and correspondingly, five outer contour points, marked as outer contour points 1-5, exist on the outer contour line, and therefore, the inner contour point 1 and the outer contour point 1, the inner contour point 2 and the outer contour point 2, . . . , the inner contour point 5 and the outer contour point 5 may be respectively connected to obtain five connection lines, and middle points of the five connection lines are respectively determined and connected to obtain the target line.

In some optional embodiments of the present disclosure, performing image deformation processing on the leg region based on the contour line and the target line of the leg region includes: performing compression processing on the leg region according to a direction from the contour line to the target line or performing stretching processing on the leg region according to a direction from the target line to the contour line.

The embodiments adopt an image deformation algorithm to perform compression or stretching processing on the leg region, specifically, performing compression or stretching processing on the leg region of the target object in the first image along the leg width direction. Taking performing compression processing on the leg region as an example, specifically, the width of the leg region is compressed to achieve the leg slimming effect.

In some embodiments, performing image deformation processing on the leg region based on the contour line and the target line of the leg region includes: performing region division on the leg region of the target object in the first image, to obtain at least two deformation regions; where different leg regions correspond to different deformation regions; performing image deformation processing on the leg region based on at least some of the at least two deformation regions, so that the leg region is compressed in the direction from the contour line to the target line or the leg region is stretched in the direction from the target line to the contour line.

In the embodiments, region division is first performed on the leg region to obtain at least two deformation regions. Exemplarily, if the target object in the first image has two legs, each leg corresponds to one leg region and each leg region corresponds to at least one deformation region. It may be understood that at least one region division line exists between two leg regions, so that one deformation region is only targeted at one leg region, and the condition that two leg regions are both deformed due to the deformation processing on one deformation region would not occur. Exemplarily, the deformation region is rectangular in an initial state. Positions of corresponding pixel points in the image are changed by means of the deformation processing on the deformation region, so as to implement the deformation processing on the leg region. The deformation region subjected to deformation processing may be a twisted curved surface. One leg region may correspond to one or more deformation regions. The image deformation processing on the leg region is implemented by means of the deformation processing on the one or more deformation regions.

In some optional embodiments of the present disclosure, respectively determining the contour line and the target line of the leg region of the target object based on the leg detection information includes: determining first leg contour points based on the leg contour point information; inserting at least one second leg contour point between two adjacent first leg contour points by means of preset interpolation; determining the contour line of the leg region based on the first leg contour points and the second leg contour point; determining first leg key points based on the leg key point information; inserting at least one second leg key point between two adjacent first leg key points by means of preset interpolation; and determining the target line of the leg region based on the first leg key points and the second leg key point.

In the embodiments, the leg contour points corresponding to the leg contour point information are discrete or sparse. For example, each leg region may have only 10 contour points, and thus the outer contour line and the inner contour line of each leg region respectively have only five contour points. To better form the contour line based on the discrete or sparse contour points, it is required to determine more contour points by means of interpolation. Moreover, similar for the leg key points corresponding to the leg key point information, to better form the target line, it is required to determine more key points by means of interpolation.

In some embodiments, if the density of boundary lines of the divided deformation regions is greater than the density of the contour points or key points of the leg region, interpolation may be performed based on the boundary lines of the deformation regions between two adjacent contour points or two adjacent key points, to obtain the second leg contour points or the second leg key points. The density of the boundary lines of the deformation regions is related to the number of the divided deformation regions. For instance, if 10 deformation regions are divided along a leg length direction for the leg region of the target object (which may also be understood as a body up-right direction, i.e., the direction from the foot to the head or the direction from the head to the foot), 11 boundary lines along the leg width direction (which may also be understood as the body up-right direction) are corresponding included, and the density of the boundary lines of the deformation regions may be marked as 11. If the outer contour line and the inner contour line of the leg region respectively have five first leg contour points, the density of the contour points of the leg region may be marked as 5. It may be thus known that the density of the boundary lines of the deformation regions is greater than the density of the contour points. In this case, two or three boundary lines of the deformation regions along the leg width direction necessarily exist between any two adjacent first leg contour points or two adjacent first leg key points. Therefore, in the embodiments, to determine more leg contour points and leg key points, interpolation may be executed based on the boundary lines of the deformation regions between the two adjacent first leg contour points and the two adjacent first leg key points, to obtain at least one second leg contour point or at least one second leg key point.

If the density of the boundary lines of the divided deformation regions is not greater than the density of the contour points or key points of the leg region, for example, two deformation regions are divided along the leg length direction for the leg region of the target object, three boundary lines along the leg width direction are correspondingly included, and the density of the boundary lines of the deformation regions may be marked as 3. If the outer contour line and the inner contour line of the leg region respectively have five first leg contour points, the density of the contour points of the leg region may be marked as 5. It may be thus known that the density of the boundary lines of the deformation regions is less than the density of the contour points. In this case, one boundary line of the deformation regions along the leg width direction exists between only a group of two adjacent contour points. Therefore, in the embodiments, to determine more contour points and key points, an auxiliary line may be determined based on the direction of the boundary line in the deformation region. For example, the auxiliary line is further divided along the leg length direction and according to the direction of the boundary line of the deformation region. The auxiliary line is disposed parallel to the direction of the boundary line of the deformation region, so that the boundary line or auxiliary line of at least one actual deformation region exists between both of any two adjacent first leg contour points and two adjacent first leg key points. Interpolation is performed based on the boundary line or the auxiliary line, so as to obtain at least one second leg contour point or at least one second leg key point.

By using the technical solutions of the embodiments of the present disclosure, based on the obtaining of the leg detection information of the target object in the image, the contour line and target line of the leg region are determined. Based on the contour line and the target line, image deformation processing is performed on the leg region, so as to implement automatic adjustment of the leg region of the target object without multiple manual operations of a user, which greatly improves operational experiences of the user.

Figure 2:
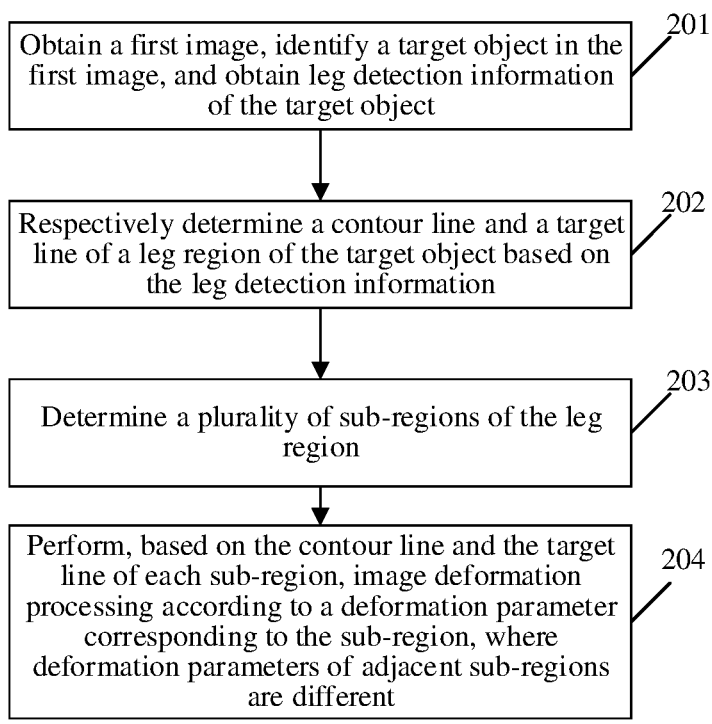
FIG. 2 is a schematic flowchart II of the method for image processing according to embodiments of the present disclosure.

Based on the aforementioned embodiments, the embodiments of the present disclosure further provide a method for image processing. FIG. 2 is a schematic flowchart II of a method for image processing according to embodiments of the present disclosure. As shown in FIG. 2, the method includes the following steps.

At step 201: a first image is obtained, a target object in the first image is identified, and leg detection information of the target object is obtained.

At step 202: a contour line and a target line of a leg region of the target object are respectively determined based on the leg detection information.

At step 203: a plurality of sub-regions of the leg region are determined.

At step 204: based on the contour line and the target line of each sub-region, image deformation processing is performed according to a deformation parameter corresponding to the sub-region, where deformation parameters of adjacent sub-regions are different.

Specific descriptions for steps 201 and 202 in the embodiments may refer to related descriptions for steps 101 and 102 above. To save space, details are not described herein again.

If the leg region is also subjected to the deformation processing according to the same deformation parameter, some parts of the leg region would seem to be quite unreasonable visually. For example, if the thigh root and the thigh are both compressed by 20%, the thigh root would seem to be "recessed" inwards visually. For another example, if the knee and the thigh are both compressed by 20%, the knee would be quite narrow, as to be broken. On this basis, in the embodiments, different sub-regions of the leg region are subjected to the image deformation processing according to different deformation parameters, so that the image deformation processing of the leg region is more natural and harmonious.

In some optional embodiments of the present disclosure, the plurality of sub-regions include a first sub-region and a second sub-region. The first sub-region and the second sub-region correspond to a thigh region of the leg region. The first sub-region is closer to a waist region of the target object than the second sub-region. The deformation parameter is a deformation proportion. A first deformation proportion corresponding to the first sub-region is less than a second deformation proportion corresponding to the second sub-region.

In some optional embodiments of the present disclosure, the leg region further includes a third sub-region corresponding to a knee region. The deformation parameter is the deformation proportion. A third deformation proportion corresponding to the third sub-region is less than the second deformation proportion corresponding to the second sub-region.

In some optional embodiments, the plurality of sub-regions include a fourth sub-region and a fifth sub-region. The fourth sub-region and the fifth sub-region correspond to a shank region of the leg region. The fifth sub-region is closer to a foot region of the target object than the fourth sub-region. The deformation parameter is a deformation proportion. A fourth deformation proportion corresponding to the fourth sub-region is greater than a fifth deformation proportion corresponding to the fifth sub-region.

In the embodiments, the leg region may be divided into an ankle region, a shank region, a knee region, a thigh region, and a thigh root region from the bottom to the top. The first sub-region may be the thigh root region. The second sub-region may be the thigh region. The thigh region and the thigh root region may be the region above the knee and below the hip. The third sub-region may be the knee region. The fourth sub-region may be the shank region. The fifth sub-region may be the ankle region. The shank region and the ankle region may be the region below the knee and above the foot.

In some implementations, the range (a start position and/or a termination position) of each sub-region may be determined according to the length of the leg region of the target object (or the length of the shank region and/or the length of the thigh region). For example, if the length of the leg region is long, a distance between an upper edge of the first sub-region and a central point of the third sub-region is a, and if the length of the leg region is short, the distance between the upper edge of the first sub-region and the central point of the third sub-region is b, a is greater than b, that is, for the leg region, the start position corresponding to the changes of the deformation parameter is related to the length of the leg region (or the thigh region). In some other implementations, the range (the start position and/or the termination position) of each sub-region may also be determined by means of a neural network model or a classification model.

In some implementations, for the first sub-region and the second sub-region, the first deformation proportion corresponding to the first sub-region is less than the second deformation proportion corresponding to the second sub-region. It may be understood that from the knee region up to the leg region, the deformation proportion is attenuated. The first deformation proportion and the second deformation proportion may be preset deformation proportions, so that the leg region in the first sub-region is subjected to the image deformation processing according to the first deformation proportion, and the leg region in the second sub-region is subjected to the image deformation processing according to the second deformation proportion.

In some implementations, the first deformation proportion and the second deformation proportion may also be determined based on a function having a specific changing trend. The function is related to the coordinate position in the sub-region. For example, if the proportion of image deformation of a certain sub-region requires to be gradually reduced, the deformation proportion corresponding to the sub-region may be determined by means of a linear progressively decreased function. The deformation proportion corresponding to the position is determined by means of a function value corresponding to a different coordinate position.

In some implementations, for the third sub-region, the third sub-region corresponds to the knee region, and therefore, the knee region cannot be excessively compressed or stretched, and thus exemplarily, the third sub-region may be correspondingly provided with a fixed third deformation proportion and the provided third deformation proportion is less than the second deformation proportion. The third deformation proportion may be same as or different from the first deformation proportion.

In some implementations, for the fourth sub-region and the fifth sub-region, the fourth deformation proportion corresponding to the fourth sub-region is greater than the fifth deformation proportion corresponding to the fifth sub-region. It may be understood that from the knee region down to the leg region, the deformation proportion is attenuated. Similarly as the first deformation proportion and the second deformation proportion above, the fourth deformation proportion and the fifth deformation proportion may be preset deformation proportions or may also be determined by the function having the specific changing trend.

It may be understood that when the leg region is divided into a fifth sub-region, a fourth sub-region, a third sub-region, a second sub-region, and a first sub-region from bottom to top, the corresponding changing trend of the deformation proportion may be small-large-small-large-small.

By using the technical solutions of the embodiments of the present disclosure, the contour line and the target line of the leg region are determined based on the obtaining of the leg detection information of the target object in the image, and image deformation processing is performed on the leg region based on the contour line and the target line, thereby achieving automatic adjustment of the leg region of the target object without multiple manual operations of the user, which greatly improves the operation experiences of the user. Moreover, image deformation processing is performed on each sub-region of the leg region according to different deformation parameters, so that the leg region subjected to deformation processing has a more harmonious proportion in the entirety of the target object. The deformation processing effect is more natural. On the other hand, the operation experiences of the user are also greatly improved.

Figure 3:
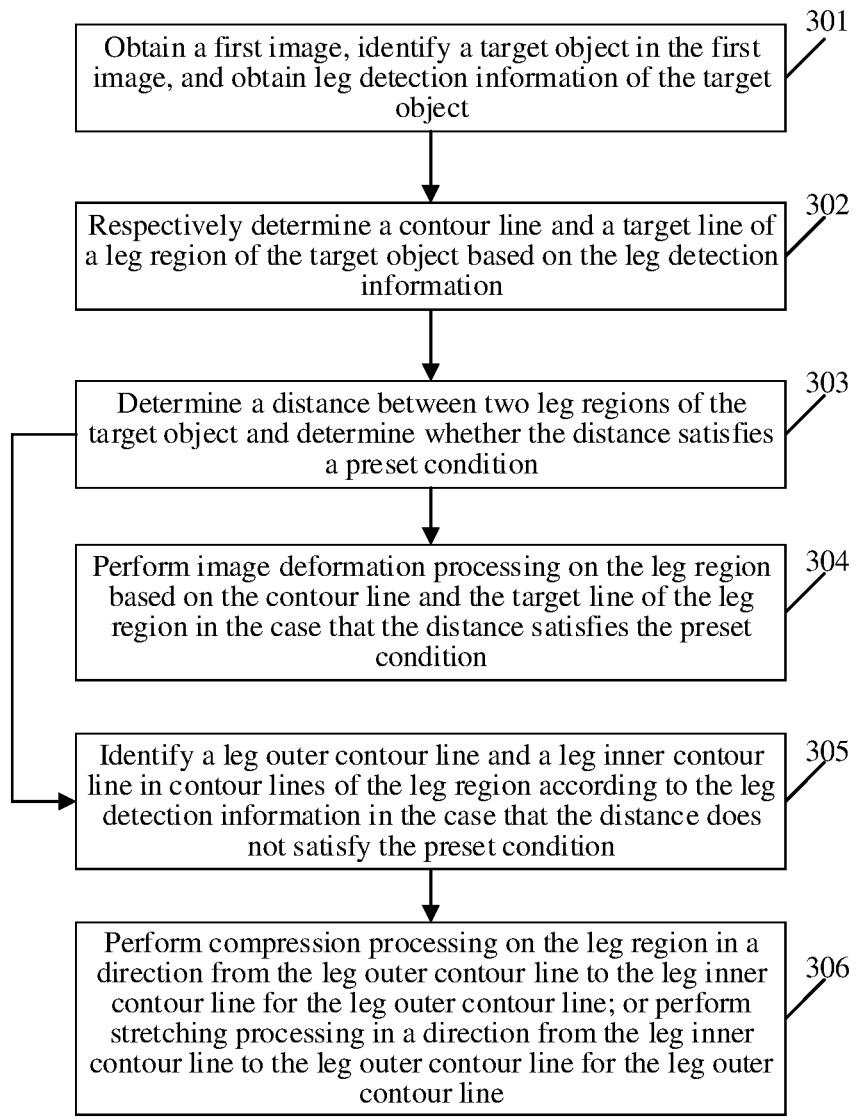
FIG. 3 is a schematic flowchart III of the method for image processing according to embodiments of the present disclosure.

Based on the aforementioned embodiments, the embodiments of the present disclosure further provide a method for image processing. FIG. 3 is a schematic flowchart III of a method for image processing according to embodiments of the present disclosure. As shown in FIG. 3, the method includes the following steps.

At step 301: a first image is obtained, a target object in the first image is identified, and leg detection information of the target object is obtained.

At step 302: a contour line and a target line of a leg region of the target object are respectively determined based on the leg detection information.

At step 303: a distance between two leg regions of the target object is determined and whether the distance satisfies a preset condition is determined At step 304: image deformation processing is performed on the leg region based on the contour line and the target line of the leg region in the case that the distance satisfies the preset condition.

At step 305: a leg outer contour line and a leg inner contour line in contour lines of the leg region are identified according to the leg detection information in the case that the distance does not satisfy the preset condition.

At step 306: compression processing is performed on the leg region in a direction from the leg outer contour line to the leg inner contour line, for the leg outer contour line; or stretching processing is performed in a direction from the leg inner contour line to the leg outer contour line, for the leg outer contour line.

Specific descriptions for steps 301 and 302 in the embodiments may refer to related descriptions for steps 101 and 102 above. To save space, details are not described herein again.

The detailed description of "performing image deformation processing on the leg region based on the contour line and the target line of the leg region" in the embodiments may refer to related descriptions for step 103 and steps 203 and 204 above. To save space, details are not described herein again.

In the embodiments, when two legs of a person are close in distance, for example, in the scene of two legs closed, independent deformation regions are difficult to be divided between the two legs. For this type of conditions, the closed two legs may be considered as an entirety for processing.

In some optional embodiments of the present disclosure, determining whether the distance satisfies the preset condition includes: obtaining a width of a specific region of the target object; determining whether the distance is greater than the width of the specific region; determining that the distance satisfies the preset condition in response to the case that the first distance is greater than the width of the specific region; and determining that the distance does not satisfy the preset condition in response to the case that the first distance is not greater than the width of the specific region.

The distance between the two legs determined in the embodiments is a relative distance, i.e., comparing the distance between the two legs and the width of the specific region of the target object, where the specific region is the region corresponding to the body part included in the target object. Exemplarily, the specific region may be one of the following regions: a head region, a neck region, a shoulder region, a chest region, a waist region, and a hip region. Hence, by identifying a width of any specific region of the target object and comparing the width with the distance between the two legs, if the distance is greater than the width of the aforementioned specific region, it is indicated that the distance between the two legs is relatively far, and the preset condition is satisfied. Accordingly, if the distance is not greater than the width of the aforementioned specific region, it is indicated that the distance between the two legs is relatively short, and the preset condition is not satisfied.

In other implementations, the determined distance between the two legs may also be represented by means of a pixel distance. By comparing the pixel distance between the two legs and a preset pixel threshold, if the pixel distance between the two legs is greater than the aforementioned preset pixel threshold, it is indicated that the distance between the two legs is relatively far, and the preset condition is satisfied. Accordingly, if the pixel distance between the two legs is not greater than the aforementioned preset pixel threshold, it is indicated that the distance between the two legs is relatively short, and the preset condition is not satisfied. The preset pixel threshold may be determined from a plurality of preset pixel thresholds based on the size of the first image and the proportion of the target object (or the leg region of the target object) in the first image. For example, for the same image size and different proportions of the target objects (or the leg regions of the target objects) in the first image, the plurality of preset threshold are set as a first group of pixel thresholds. For different image sizes, the pixel threshold corresponding to the target objects (or the leg region of the target object) having different proportions in each image size may be obtained based on the first group of pixel thresholds. The matched pixel threshold may be obtained by means of the size of the first image and the proportion of the target object (or the leg region of the target object) in the first image.

In some optional embodiments of the present disclosure, determining the distance between the two leg regions of the target object includes: determining knee key point information in the leg region based on the leg key point information of the target object; and determining, based on the knee key point information, a first distance between two knees respectively corresponding to the two leg regions. Correspondingly, determining whether the distance satisfies the preset condition includes: determining whether the first distance satisfies the preset condition.

In the embodiments, the distance (i.e., a first distance) between the knees is used as the distance between the two legs. In some implementations, the leg key point information may include knee key points, and therefore, the first distance may be directly determined based on the knee key points in the two leg regions.

In other implementations, the distance between the two leg regions may also be determined by means of other key point information of the leg region, or the distance between the two leg regions may further be determined by means of all of the corresponding key point information of the two leg regions. For example, all the distances between corresponding two key points on two target lines of the leg regions are respectively calculated to obtain multiple distances, and an average value of the multiple distances is calculated as the distance between the two leg regions. Exemplarily, if the target lines of the two leg regions all have seven key points, respectively marked as key point 1, key point 2, . . . , and key point 7. The distance between two key points 1, the distance between two key points 2, . . . , and the distance between two key points 7 of the two leg regions are respectively calculated to obtain seven distances, and an average value of the seven distances are further calculated as the distance between the two leg regions.

In some optional embodiments of the present disclosure, the method further includes: identifying a leg outer contour line and a leg inner contour line in contour lines of the leg region according to the leg detection information when the distance does not satisfy the preset condition; and performing compression processing on the leg region in a direction from the leg outer contour line to the leg inner contour line for the leg outer contour line; or performing stretching processing in a direction from the leg inner contour line to the leg outer contour line for the leg outer contour line.

In the embodiments, when the distance between the two leg regions does not satisfy the preset condition, i.e., the distance between the two legs is small, the image deformation solution in the abovementioned embodiments of the present disclosure cannot be adopted. Hence, by determining the leg outer contour line and leg inner contour line in the contour lines of the leg region, compression processing is performed on the leg region along the direction from the leg outer contour line towards the leg inner contour line for the leg outer contour line, or stretching processing is performed along the direction from the leg inner contour line towards to the leg outer contour line for the leg outer contour line.

By using the technical solutions of the embodiments of the present disclosure, based on the obtaining of the leg detection information of the target object in the image, the contour line and target line of the leg region are determined. Based on the contour line and the target line, image deformation processing is performed on the leg region, so as to implement automatic adjustment of the leg region of the target object without multiple manual operations of a user, which greatly improves operational experiences of the user.

Figure 4:
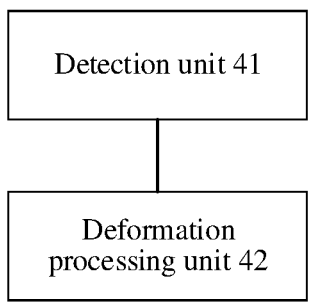
FIG. 4 is a schematic structural diagram of components of an apparatus for image processing according to embodiments of the present disclosure.

The embodiments of the present disclosure also provide an apparatus for image processing. FIG. 4 is a schematic structural diagram of components of an apparatus for image processing according to embodiments of the present disclosure. As shown in FIG. 4, the apparatus includes a detection unit 41 and a deformation processing unit 42.

The detection unit 41 is configured to obtain a first image, identify a target object in the first image, and obtain leg detection information of the target object; and respectively determine a contour line and a target line of a leg region of the target object based on the leg detection information.

The deformation processing unit 42 is configured to perform image deformation processing on the leg region based on the contour line and the target line of the leg region determined by the detection unit 41 to generate a second image.

In some optional embodiments of the present disclosure, the leg detection information includes leg contour point information and leg key point information.

The detection unit 41 is configured to determine the contour line of the leg region of the target object based on the leg contour point information and determine the target line of the leg region based on the leg key point information.

In some optional embodiments of the present disclosure, the leg detection information includes leg contour point information.

The detection unit 41 is configured to determine the contour line of the leg region of the target object based on the leg contour point information; and determine a central point of the leg region based on the leg contour point information, determine a central line based on the determined central point, and determine the central line as the target line.

In the embodiments, the deformation processing unit 42 is configured to perform compression processing on the leg region according to a direction from the contour line to the target line or perform stretching processing on the leg region according to a direction from the target line to the contour line.

In some optional embodiments of the present disclosure, the deformation processing unit 42 is configured to determine a plurality of sub-regions of the leg region; and perform, based on the contour line and the target line of each sub-region, the image deformation processing according to a deformation parameter corresponding to the sub-region, where deformation parameters of adjacent sub-regions are different.

In some optional embodiments of the present disclosure, the plurality of sub-regions include a first sub-region and a second sub-region. The first sub-region and the second sub-region correspond to a thigh region of the leg region. The first sub-region is closer to a waist region of the target object than the second sub-region.

The deformation parameter is a deformation proportion. A first deformation proportion corresponding to the first sub-region is less than a second deformation proportion corresponding to the second sub-region.

In some optional embodiments of the present disclosure, the leg region further includes a third sub-region corresponding to a knee region. A third deformation proportion corresponding to the third sub-region is less than the second deformation proportion corresponding to the second sub-region.

In some optional embodiments of the present disclosure, the plurality of sub-regions include a fourth sub-region and a fifth sub-region. The fourth sub-region and the fifth sub-region correspond to a shank region of the leg region. The fifth sub-region is closer to a foot region of the target object than the fourth sub-region.

A fourth deformation proportion corresponding to the fourth sub-region is greater than a fifth deformation proportion corresponding to the fifth sub-region.

In some optional embodiments of the present disclosure, the detection unit 41 is further configured to determine a distance between two leg regions of the target object and determine whether the distance satisfies a preset condition.

The deformation processing unit 42 is further configured to perform image deformation processing on the leg region based on the contour line and the target line of the leg region when the detection unit 41 determines that the distance satisfies the preset condition.

In some embodiments, the detection unit 41 is configured to obtain a width of a specific region of the target object; determine whether the distance is greater than the width of the specific region; determine that the distance satisfies the preset condition in the case that the first distance is greater than the width of the specific region; and determine that the distance does not satisfy the preset condition in the case that the first distance is not greater than the width of the specific region.

In some optional embodiments of the present disclosure, the detection unit 41 is configured to determine knee key point information in the leg region based on leg key point information of the target object; and determine, based on the knee key point information, a first distance between two knees respectively corresponding to the two leg regions. The detection unit is further configured to determine whether the first distance is greater than the width of the specific region.

In optional embodiments of the present disclosure, the specific region is a region corresponding to a body part included in the target object. The specific region is one of the following regions: a head region, a neck region, a shoulder region, a chest region, a waist region, and a hip region.

In optional embodiments of the present disclosure, the detection unit 41 is further configured to identify a leg outer contour line and a leg inner contour line in contour lines of the leg region according to the leg detection information when the distance does not satisfy the preset condition.

The deformation processing unit 42 is further configured to perform compression processing on the leg region in a direction from the leg outer contour line to the leg inner contour line for the leg outer contour line; or perform stretching processing in a direction from the leg inner contour line to the leg outer contour line for the leg outer contour line.

In the embodiments of the present disclosure, the detection unit 41 and the deformation processing unit 42 in the apparatus for image processing may all be implemented, in actual applications, by a Central Processing Unit (CPU), a Digital Signal Processor (DSP), a Microcontroller Unit (MCU), or a Field-Programmable Gate Array (FPGA).

It should be noted that: when performing image processing, the apparatus for image processing provided by the aforementioned embodiments are exemplified by division of the various procedure modules above. In the practical application, the processing allocations above may be achieved by different procedure modules as needed. That is, the internal structure of the apparatus is divided into different procedure modules to achieve all or some of the processing described above. In addition, the apparatus for image processing provided by the aforementioned embodiments and the method for image processing embodiment belong to the same concept. Please refer to the method embodiment for the specific implementation process of the apparatus for image processing. The details are not described here again.

Figure 5:
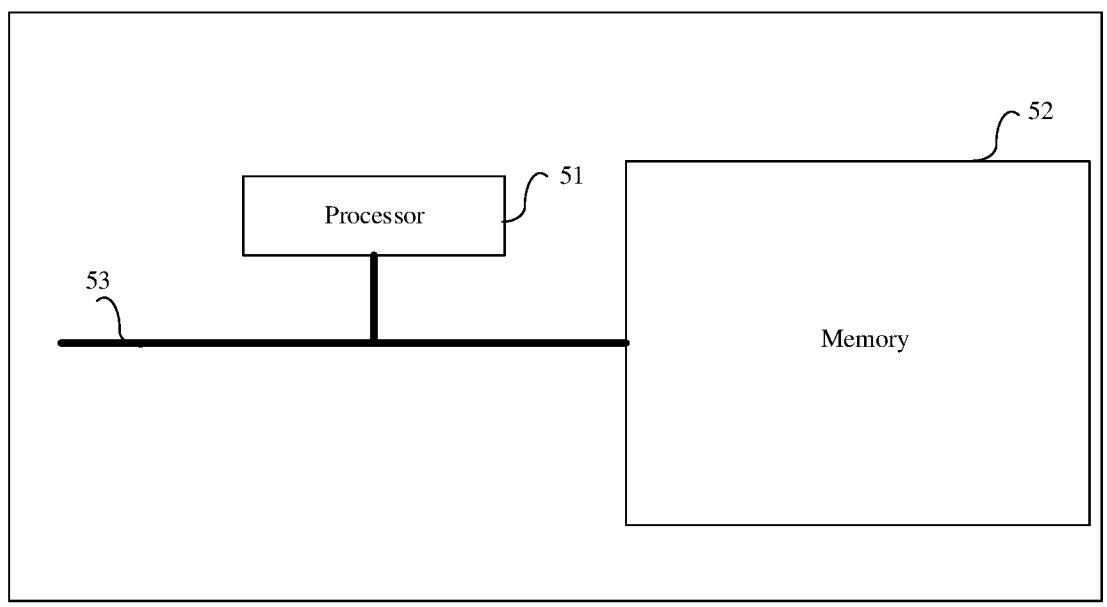
FIG. 5 is a schematic structural diagram of hardware components of the apparatus for image processing according to embodiments of the present disclosure.

The embodiments of the present disclosure also provide an apparatus for image processing. FIG. 5 is a schematic structural diagram of hardware components of the apparatus for image processing according to embodiments of the present disclosure. As shown in FIG. 5, the apparatus for image processing includes a memory 52, a processor 51, and a computer program stored on the memory 52 and capable of being run on the processor 51, where the computer program, when executed by the processor 51, performs steps of the method for image processing according to any one of the embodiments of the present disclosure.

It may be understood that various components in the apparatus for image processing are coupled together by means of a bus system 53. As may be understood, the bus system 53 is used for implementing connection communication among these components. In addition to a data bus, the bus system 53 further includes a power bus, a control bus, and a state signal bus. However, for the sake of clarity, all buses are marked as the bus system 53 in FIG. 5.

It may be understood that the memory 52 may be a volatile memory or a non-volatile memory, or both. The non-volatile memory may be a Read Only Memory (ROM), a Programmable Read-Only Memory (PROM), an Erasable Programmable Read-Only Memory (EPROM), an Electrically Erasable Programmable Read-Only Memory (EEPROM), a ferromagnetic random access memory (FRAM), a flash memory, a magnetic surface memory, an optical disc, or a Compact Disc Read-Only Memory (CD-ROM). The magnetic surface memory may be a magnetic disc memory or a magnetic tape memory. The volatile memory may be a Random Access Memory (RAM), which acts as an external cache. By way of example instead of limitation, many forms of RAMs are available, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM), and a Direct Rambus Random Access Memory (DRRAM). The memory 52 described in the embodiments of the present disclosure is intended to include, but is not limited to, these memories and any other suitable types of memories.

The method disclosed by the aforementioned embodiments of the present disclosure may be applied to the processor 51, or is implemented by the processor 51. The processor 51 may be an integrated circuit chip and has a signal processing ability. During implementation, the steps of the aforementioned method may be completed by means of the integrated logic circuit of the hardware in the processor 51 or the instruction in the form of software. The aforementioned processor 51 may be a general-purpose processor, a DSP, another programmable logic component, a discrete gate or a transistor logic component, a discrete hardware component, or the like. The processor 51 may implement or execute the methods, steps, and logical block diagrams disclosed in the embodiments of the present disclosure. The general-purpose processor may be a microprocessor or any conventional processor, or the like. The steps of the method disclosed with reference to the embodiments of the present disclosure are directly implemented by a hardware decoding processor, or are implemented by using a combination of hardware and software modules in the decoding processor. The software module may be located in a storage medium, and the storage medium is located at the memory 52. The processor 51 reads information in the memory 52 and completes the steps of the method above with reference to hardware thereof.

It should be noted that, when the apparatus for image processing provided in the foregoing embodiments performs image processing, division of the program modules above is merely used as an example for description. In actual application, the processing above is allocated to different program modules according to requirements; that is, an internal structure of the apparatus is divided into different program modules, so as to complete all or some of the processing above. In addition, the apparatus for image processing provided in the foregoing embodiments and the embodiments of the method for image processing belong to a same concept. For a specific implementation process, reference is made to the method embodiments. Details are not described here again.

In exemplary embodiments, the embodiments of the present disclosure further provide a computer readable storage medium, such as, the memory including a computer program. The computer program is executed by the processor in the apparatus for image processing to complete the steps of the aforementioned method. The computer readable storage medium may be a memory such as FRAM, ROM, PROM, EPROM, EEPROM, a flash memory, a magnetic surface memory, an optical disc, or CD-ROM, and may also be any device including one or any combination of the aforementioned memories, such as a mobile phone, a computer, a tablet device, or a personal digital assistant.

The embodiments of the present disclosure also provide a computer-readable storage medium. A computer instruction is stored thereon, and when the instruction is executed by the processor, the method for image processing according to any one of embodiments of the present disclosure is implemented.

The embodiments of the present disclosure further provide a computer program product, including a computer executable instruction, and when the computer executable instruction is executed, the steps of the method for image processing according to any one of embodiments of the present disclosure are implemented.

It should be understood that the disclosed device and method in the few embodiments provided in the present disclosure may be implemented in another manner. The device embodiments described above are merely exemplary. For example, the unit division is merely logical function division and may be actually implemented by other division modes. For example, a plurality of units or components may be combined or integrated into another system, or some features may be ignored or not performed. In addition, the displayed or discussed components may be mutually coupled, or directly coupled, or communicatively connected by means of some interfaces, or indirectly coupled or communicatively connected by a device or unit, and may be electrically, mechanically, or in another form.

The foregoing units described as separate parts may or may not be physically separate, and parts displayed as units may or may not be physical units, may be located in one place, or may be distributed on multiple network units. Some or all of the units may be selected according to actual requirements to implement the objectives of the solutions in the embodiments.

The foregoing units described as separate parts may or may not be physically separate, and parts displayed as units may or may not be physical units, may be located in one place, or may be distributed on multiple network units. Some or all of the units may be selected according to actual requirements to implement the objectives of the solutions in the embodiments.

A person of ordinary skill in the art may understand that all or some steps for implementing the foregoing method embodiments may be achieved by a program by instructing related hardware; the foregoing program may be stored in a computer readable storage medium;

when the program is executed, steps including the foregoing method embodiments are executed. Moreover, the foregoing storage medium includes various media capable of storing program codes, such as a movable storage apparatus, ROM, RAM, a magnetic disc, or an optical disc.

Alternatively, when the aforementioned integrated unit of the present disclosure is implemented in a form of a software functional unit and sold or used as an independent product, the integrated unit may be stored in one computer readable storage medium. Based on such an understanding, the technical solutions in the embodiments of the present disclosure or a part thereof contributing to the prior art may be essentially represented in a form of software product. The computer software product is stored in one storage medium including several instructions so that one computer device (which may be a personal computer, a server, a network device, and the like) implements all or a part of the method in the embodiments of the present disclosure. Moreover, the preceding storage medium includes media capable of storing program codes, such as a mobile storage device, the ROM, the RAM, the magnetic disc, or the optical disc.

The descriptions above only specify implementations of this disclosure. However, the scope of protection of this disclosure is not limited thereto. Within the technical scope disclosed by this disclosure, any variation or substitution that may be easily conceived of by those skilled in the art should all fall within the scope of protection of this disclosure. Therefore, the scope of protection of the present disclosure should be subjected to the scope of protection of the claims.

The invention claimed is:

1. A method for image processing, comprising:
   obtaining a first image, identifying a target object in the first image, and obtaining leg detection information of the target object;
   respectively determining a contour line and a target line of a leg region of the target object based on the leg detection information; and
   performing image deformation processing on the leg region based on the contour line and the target line of the leg region to generate a second image.

2. The method according to claim 1, wherein the leg detection information comprises leg contour point information and leg key point information; and
   respectively determining the contour line and the target line of the leg region of the target object based on the leg detection information comprises:
   determining the contour line of the leg region of the target object based on the leg contour point information and determining the target line of the leg region based on the leg key point information.

3. The method according to claim 1, wherein the leg detection information comprises leg contour point information; and
   respectively determining the contour line and the target line of the leg region of the target object based on the leg detection information comprises:
   determining the contour line of the leg region of the target object based on the leg contour point information; and
   determining a central point of the leg region based on the leg contour point information, determining a central line based on the determined central point, and determining the central line as the target line.

4. The method according to claim 1, wherein performing image deformation processing on the leg region based on the contour line and the target line of the leg region comprises:
   performing compression processing on the leg region according to a direction from the contour line to the target line or performing stretching processing on the leg region according to a direction from the target line to the contour line.

5. The method according to claim 1, wherein performing image deformation processing on the leg region based on the contour line and the target line of the leg region comprises:
   determining a plurality of sub-regions of the leg region; and
   performing, based on the contour line and the target line of each sub-region, image deformation processing according to a deformation parameter corresponding to the sub-region, wherein deformation parameters of adjacent sub-regions are different.

6. The method according to claim 5, wherein the plurality of sub-regions comprise a first sub-region and a second sub-region; the first sub-region and the second sub-region correspond to a thigh region of the leg region; the first sub-region is closer to a waist region of the target object than the second sub-region; and
   the deformation parameter is a deformation proportion; and a first deformation proportion corresponding to the first sub-region is less than a second deformation proportion corresponding to the second sub-region.

7. The method according to claim 6, wherein the leg region further comprises a third sub-region corresponding to a knee region; and a third deformation proportion corresponding to the third sub-region is less than the second deformation proportion corresponding to the second sub-region.

8. The method according to claim 6, wherein the plurality of sub-regions comprise a fourth sub-region and a fifth sub-region; the fourth sub-region and the fifth sub-region correspond to a shank region of the leg region; the fifth sub-region is closer to a foot region of the target object than the fourth sub-region; and
   a fourth deformation proportion corresponding to the fourth sub-region is greater than a fifth deformation proportion corresponding to the fifth sub-region.

9. The method according to claim 1, before performing image deformation processing on the leg region based on the contour line and the target line of the leg region, further comprising:
   determining a distance between two leg regions of the target object and determining whether the distance satisfies a preset condition; and
   performing image deformation processing on the leg region based on the contour line and the target line of the leg region comprises:
   performing image deformation processing on the leg region based on the contour line and the target line of the leg region when the distance satisfies the preset condition.

10. The method according to claim 9, wherein determining whether the distance satisfies the preset condition comprises:
    obtaining a width of a specific region of the target object;

determining whether the distance is greater than the width of the specific region;

determining that the distance satisfies the preset condition in the case that the distance is greater than the width of the specific region; and determining that the distance does not satisfy the preset condition in the case that the distance is not greater than the width of the specific region.

11. The method according to claim 10, wherein the specific region is a region corresponding to a body part comprised in the target object; and the specific region is one of the following regions: a head region, a neck region, a shoulder region, a chest region, a waist region, and a hip region.

12. The method according to claim 9, wherein determining the distance between the two leg regions of the target object comprises:

determining knee key point information in the leg region based on leg key point information of the target object;

determining, based on the knee key point information, a first distance between two knees respectively corresponding to the two leg regions; and determining whether the distance satisfies the preset condition comprises: determining whether the first distance satisfies the preset condition.

13. The method according to claim 9, further comprising:

identifying a leg outer contour line and a leg inner contour line in contour lines of the leg region according to the leg detection information when the distance does not satisfy the preset condition; and performing compression processing on the leg region in a direction from the leg outer contour line to the leg inner contour line, for the leg outer contour line; or performing stretching processing in a direction from the leg inner contour line to the leg outer contour line, for the leg outer contour line.

14. An apparatus for image processing, comprising: a processor and a memory, wherein the memory is configured to store computer program instructions that, when executed by the processor, cause the processor to perform a method for image processing comprising:

obtaining a first image, identifying a target object in the first image, and obtaining leg detection information of the target object;

respectively determining a contour line and a target line of a leg region of the target object based on the leg detection information; and performing image deformation processing on the leg region based on the contour line and the target line of the leg region to generate a second image.

15. The apparatus according to claim 14, wherein the leg detection information comprises leg contour point information and leg key point information; and the processor is configured to determine the contour line of the leg region of the target object based on the leg contour point information and determine the target line of the leg region based on the leg key point information.

16. The apparatus according to claim 14, wherein the leg detection information comprises leg contour point information; and the processor is configured to determine the contour line of the leg region of the target object based on the leg contour point information; and determine a central point of the leg region based on the leg contour point information, determine a central line based on the determined central point, and determine the central line as the target line.

17. The apparatus according to claim 14, wherein the processor is configured to perform compression processing on the leg region according to a direction from the contour line to the target line or perform stretching processing on the leg region according to a direction from the target line to the contour line.

18. The apparatus according to claim 14, wherein the processor is configured to determine a plurality of sub-regions of the leg region; and perform, based on the contour line and the target line of each sub-region, image deformation processing according to a deformation parameter corresponding to the sub-region, wherein deformation parameters of adjacent sub-regions are different.

19. The apparatus according to claim 18, wherein the plurality of sub-regions comprise a first sub-region and a second sub-region; the first sub-region and the second sub-region correspond to a thigh region of the leg region; the first sub-region is closer to a waist region of the target object than the second sub-region; and the deformation parameter is a deformation proportion; and a first deformation proportion corresponding to the first sub-region is less than a second deformation proportion corresponding to the second sub-region.

20. A non-transitory computer-readable storage medium, having stored thereon a computer program that, when executed by a processor, causes the processor to perform a method for image processing comprising:

obtaining a first image, identifying a target object in the first image, and obtaining leg detection information of the target object;

respectively determining a contour line and a target line of a leg region of the target object based on the leg detection information; and performing image deformation processing on the leg region based on the contour line and the target line of the leg region to generate a second image.

* * * * *